Figure 1:
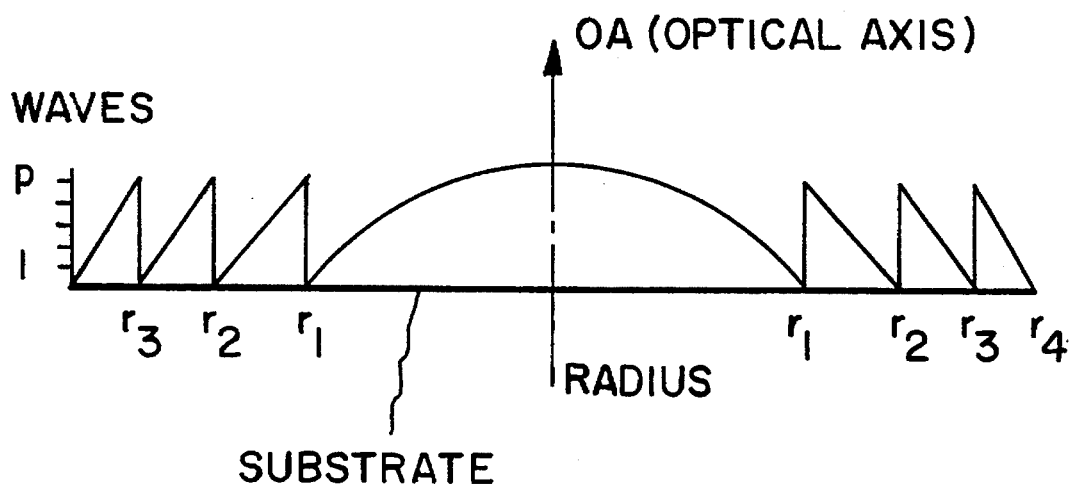

United States Patent [19]
Faklis et al.

[11] Patent Number: 5,589,982
[45] Date of Patent: Dec. 31, 1996

[54] POLYCHROMATIC DIFFRACTIVE LENS

[75] Inventors: Dean Faklis; G. Michael Morris, both of Fairport, N.Y.

[73] Assignee: Rochester Photonics Corporation, Rochester, N.Y.

[21] Appl. No.: 254,018

[22] Filed: Jun. 3, 1994

[51] Int. Cl.$^6$ .............................. G02B 5/18; G02B 27/44
[52] U.S. Cl. .................. 359/565; 359/566; 359/569; 359/571; 359/572; 359/574
[58] Field of Search .................... 359/16, 19, 565, 359/566, 569, 571, 572, 574

[56] References Cited

U.S. PATENT DOCUMENTS

| | | | |
|---|---|---|---|
| 4,637,697 | 1/1987 | Freeman | 359/565 |
| 4,936,665 | 6/1990 | Whitney | 359/565 |
| 4,936,666 | 6/1990 | Futhey . | |
| 5,013,133 | 5/1991 | Burall et al. . | |
| 5,071,207 | 12/1991 | Ceglio . | |
| 5,144,483 | 9/1992 | Cohen | 359/565 |
| 5,153,778 | 10/1992 | Sasian-Alvarado . | |
| 5,178,636 | 1/1993 | Silberman . | |
| 5,237,451 | 8/1993 | Saye . | |
| 5,257,132 | 10/1993 | Ceglio . | |
| 5,299,797 | 4/1994 | Futhey . | |
| 5,442,480 | 8/1995 | Swanson et al. | 359/565 |

FOREIGN PATENT DOCUMENTS

WO91/12551  8/1991  WIPO .

OTHER PUBLICATIONS

Simpson et al, "Imaging Properties of Modified Fresnel Zone Plates," Optica Acta, 1984, vol. 31, No. 4, pp. 403–413.
Marron, Proc. SPIE 1211, 62–66 (1990).
Futhey et al, 1991 Annual Mtg. Op. Soc Amer. Tech Digest, Paper TURS2.
Dammann, Appl. Opt. 17, 2273–2279 (1978).
Dammann, Optik 53, 409–417 (1979).
Farn et al, NASA Conf on Binary Optics, Feb. 1993, pp. 409 to 421.
Faklis & Morris, Opt. Eng. 28, 6, 592–598 (Jun. 1989).
Kato et al, Appl. Opt., 28, 4, 682–686, 15 Feb. 89.
Farn & Goodman, J. Opt. Soc. Am., A/vol. 8, 6, 860–867, Jun. 1991.
Faklis & Morris, 1993 Photonics Design Handbook, pp. H405–H411.
Judd & Wyszecki—Color in Business, Science & Industry Wiley, N.Y. 1975—CIE 1931 Std. Color. Obsv., pp. 208–209.

Primary Examiner—Jon W. Henry
Attorney, Agent, or Firm—Kenneth LuKacher; M. LuKacher

[57] ABSTRACT

A polychromatic diffractive lens is usable with broadband or multi-spectral illumination to bring a plurality of spectral components of the illumination to a common focus in space. The lens has a Fresnel zone structure of zones and a profile which provides a phase jump delay at each zone boundary to the illumination of at least one of the spectral components which is greater than one period (wave) of that wavelength, and more particularly, a multiple of $2\pi p$, where p is an integer greater than or equal to two. The parameter p and the width of the zones are selected so that the spectral components are directed, and if desired directed so as to be brought to the common focus with high diffraction efficiency in distinct diffractive orders, the lens thereby being a multi-order diffractive (MOD) lens. Applications for MOD lenses are in color (RGB) displays, color laser printers, which printers may utilize one MOD lens to image laser beams in red, blue and green wavelengths (multi-spectral illumination) to the same focal spot for forming color images as the beams scan an image forming element, such as a xerographic receptor.

21 Claims, 2 Drawing Sheets

POLYCHROMATIC DIFFRACTIVE LENS

The present invention relates to diffractive lens elements of the type which are also known as phase Fresnel lenses, zone plate lenses and kinoforms and particularly to multi-order diffractive lenses which may be used with broadband or multi-spectral illumination to bring a plurality of spectral components of the illumination to a common region in space.

The invention is useful in providing diffractive achromat lenses which bring two spectral components to a common focus and also apochromat diffractive lenses which bring three spectral components (for example, at wavelengths in the red, blue and green (RBG) to a single focus). The components that are focused may be of visible as well as invisible wavelengths so as to provide visible marker beams in medical instruments, such as laser scalpels which use an infrared wavelength for surgical applications. Achromat diffractive lenses in accordance with the invention which operate at red and green wavelengths are useful in photolithography. Apochromats in accordance with the invention are useful in color (RGB) displays and color printers wherein a single diffractive lens may be used to bring several spectral components to a common focus as on a receptor, such as a xerographic drum or belt used in the laser printer. Diffractive lenses embodying the invention are also suitable for use as wide field lenses or landscape lenses to bring multicolor images into focus at the same image plane.

Various diffractive lens constructions have been proposed. Such lenses use circular zones the boundaries of which are at radii, $r_j$ which are obtained by solving the following equation: $\phi(r_j)=2\pi j=s_1 r_j^2+s_2 r_j^2+s_2 r_j^4+s_3 r_j^6+\ldots$, where $\phi(r)$ represents the desired phase of the wavefront emerging from the element at radius r from the optical axis. The phase coefficient $s_1$ determines the optical (or focusing) power of the element. The phase coefficients $s_2$, $s_3$, etc. determine the aspheric contributions to the wavefront. The blaze profile within each zone, which may be a quadratic blaze profile or a step profile which approximates a quadratic blaze profile, provides at each boundary a phase shift or phase delay of one period (one wave) at the design wavelength of the lens. This a $2\pi$ phase shift. Such a diffractive lens has been referred to as having a maximum phase modulation of $2\lambda$ and can allow a mutual focus for simple harmonics of the design wavelength. Most different wavelengths come to different focii. Optical power also varies linearly with the wavelength of light. Thus, while diffractive lenses are known which are operative at the design wavelength and even are capable of correction for aberrations, a single diffractive lens which is capable of bringing broadband, or multi-spectral illumination to a common focus, especially with high diffraction efficiency, has not heretofore been provided. Such existing diffractive lenses which use a one wave or period phase jump at the zone boundaries is shown in Silberman, U.S. Pat. No. 5,178,636, issued Jan. 12, 1993 and a wide field diffractive imaging lens which is aberration corrected is shown in D. A. Buralli and G. M. Morris, U.S. Pat. No. 5,013,133, issued May 7, 1991.

Diffractive imaging lenses have been suggested which utilize more than one wave phase jump at zone boundaries, but such lenses were designed without any interest in focusing multiple wavelengths and use the same diffraction order. Such lenses have sometimes been called "super-zone diffractive lenses" and are motivated by the desire to keep the zone spacing above (wider than) the resolution limit imposed by the particular fabrication method (diamond-turning, laser pattern generation, or photolithography) which is used. When the zone spacing begins to approach the limits of resolution of the fabrication method, the phase jump at the zone boundaries increases to beyond one wave. Several successive increases in phase jump may be used as the outside or diameter of the lens increases. Such lenses are described in an article by J. C. Marron, et al., "Higher-Order Kinoforms" in "Computer and Optically Formed Holographic Optics," I. Cindrich, et al., editors, Proc. SPIE 1211, 62–66 (1990); Futhey, U.S. Pat. No. 4,936,666, issued Jun. 26, 1990; Futhey, et al., 1991 Annual Meeting of the Optics Society of America, Tech Digest, Paper TuRS.2, Futhey et al, U.S. Pat. No. 5,229,797, issued Jul. 20, 1993; and Saxe, U.S. Pat. No. 5,237,451 issued Aug. 17, 1993. Thus a multi-order diffractive (MOD) lens which bring a broadband of wavelengths or multi spectral illumination to a common focus is an objective which is neither sought nor obtained with super zone type diffractive lenses.

Different wavelengths may be brought to a common image plane but at different lines in a plane by diffractive color separation filters which involve common gratings of constant periodicity. Such gratings use different diffraction orders for each wavelength, but do not focus multiple wavelengths at a common focus in the image plane, as do MOD lenses in accordance with the present invention. The following articles deal with such color separation gratings. H. Dammann, "Color separation gratings," Appl. Opt. 17, 2273–2279 (1978); H. Dammann, "Spectral characteristics of stepped-phase gratings," Optik 53, 409–417 (1979); and M. W. Farn, R. E. Knowlden, M. B. Stern, and W. B. Veldkamp, "Color Separation Gratings," NASA Conference on Binary Optics, Huntsville, AL, February 1993.

In order to bring several wavelengths to a common focus diffractive systems using diffractive optical elements in series (i.e., separate diffractive lenses) have been suggested. Each lens has the conventional $2\pi$ or one wave phase shift at each zone boundary and may use the same diffractive order. Such broadband lenses are described in the following articles: D. Faklis and G. M. Morris, "BroadBand Imaging With Holographic Lenses", Optical Engineering, Vol. 28, No. 6, 592–598 (June 1989); M. Kato, et al., "Wavelength Independent Grating Lens System", Applied Optics, Vol. 28, No. 4, 682–686, 15 February 1989; and M. W. Farn and J. W. Goodman, "Diffractive Doublets Corrected at Two Wavelengths", J. Opt. Soc. Am. A/Vol. 8, No. 6, 860–867, June 1991.

It has been proposed to use segmented diffractive lenses to bring multiple wavelengths to a common focus. These lenses are in different pie-shaped regions which have different focal lengths obtained by using different zone spacing and may use superzones, as in the superzone diffractive lenses discussed above. Such segments are also used in combination with multilayer coatings which act like color filters. The entire lens area is not used for each of the wavelengths to bring it to focus. In effect, such segmented lenses are parallel versions of the tandem arranged diffractive lenses discussed above. The following patents show such segmented lenses: Ceglio, U.S. Pat. No. 5,071,207 issued Dec. 10, 1991 and U.S. Pat. No. 5,257,132 issued Oct. 26, 1993.

A hybrid, diffractive/refractive lens having no focusing power and with the objective of correcting for field aberrations is discussed in Sasian Alvarado, U.S. Pat. No. 5,153,778 issued Oct. 6, 1992. The designer of the lens shown in this patent is not interested in focusing multiple wavelengths to a common focus or in using different diffractive orders.

Hybrid diffractive/refractive lens is shown in Swanson, International Patent Application WO91/12551 published Aug. 22, 1991. The diffractive lens focuses at one wavelength while the refractive lens focuses at another wavelength. A single diffractive element as provided by a MOD lens in accordance with the invention for focusing several wavelengths at the same point is not contemplated by anything described in this International Published Application.

Accordingly, it is the principal object of the present invention to provide improved diffractive elements, particularly diffractive lenses which are capable of bringing two or more spectral components of optical illumination or broadband illumination to essentially a common focus in space.

It is a further object of the present invention to provide an improved diffractive lens which is useful in conjunction with either broadband or multi-spectral illumination and is capable of bringing different wavelengths of the illumination in distinct diffractive orders to a common focus with high diffraction efficiency, such lenses being referred to herein as multi-order diffractive (MOD) lenses.

It is a still further object of the present invention to provide an improved diffractive achromat or apochromat lens.

It is a still further object of the present invention to provide an improved diffractive singlet capable of bringing a plurality of spectral components of illumination to a common focus in space, and which may be used to form multi-spectral images at the same spatial location, for example, by focusing wavelengths in red, green and blue via the singlet to the same spatial location.

Briefly described, a diffractive element or lens in accordance with the invention is capable of focusing a plurality of different wavelengths of light to a single focus. A diffractive structure is used having a plurality of annular zones which define zone boundaries which diffract light of each of the wavelengths in a different diffractive order to the focus thereby providing a plural or multiple order diffractive singlet.

The imaging properties of a plural or multi-order diffractive (MOD) lens enable the use of the lens in conjunction with light that has either a broad spectral range or a spectrum consisting of multiple spectral bands. The MOD lens differs from standard diffractive lenses in that the phase delay or jump at the zone boundaries is a multiple of waves at the design wavelength (a multiple of $2\pi$, i.e., $\phi(r_j)=2\pi p$, where p is an integer $\geq 2$, and the location of the zone radii are obtained by solving the equation $\phi(r_j)=2\pi pj$, where $\phi(r)$ represents the phase function for the wavefront emerging from the lens. The number of $2\pi$ phase jumps, p, represents a degree of freedom that an optical designer can use distinct diffraction orders to bring two or more spectral components to focus at the same spatial location.

Figure 3:
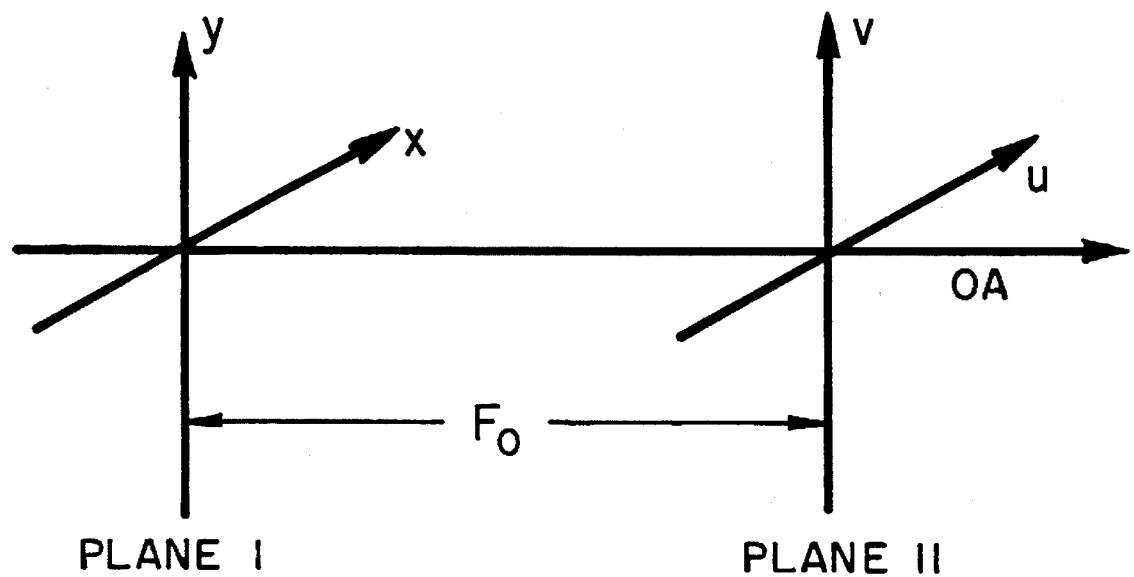
Figure 2:
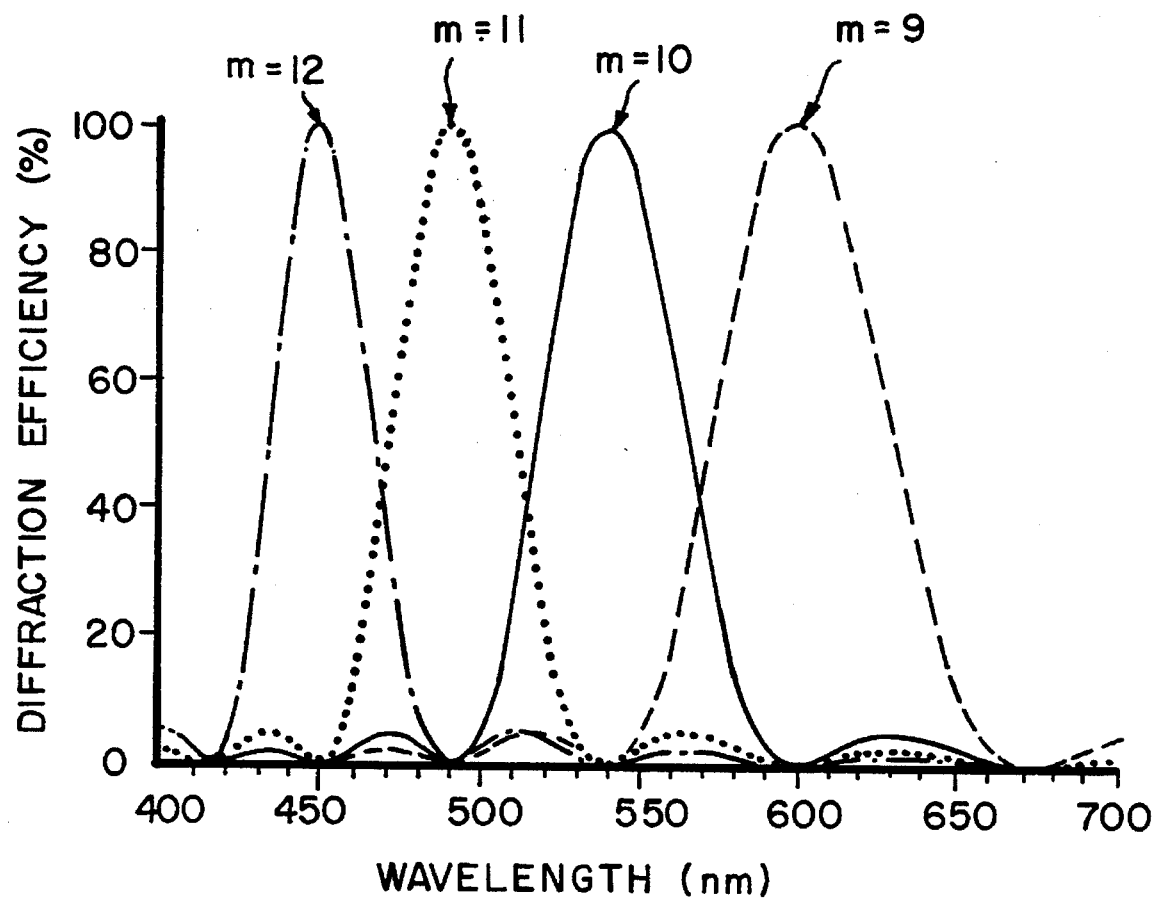

The foregoing and other objects, features and advantages of the invention as well as presently preferred embodiments thereof will become more apparent from a reading of the following description in connection with the accompanying drawings in which:

FIG. 1 is a diagram illustrating the construction of a MOD lens in accordance with the invention, the lens having a continuous blaze profile;

FIG. 2 is a plot of the diffraction efficiency of different diffraction orders (m=the order) for a MOD lens with phase jumps at each phase boundary, $2\pi p$, where p is equal to 10 and where the design wavelength of the lens, $\lambda_0$ is 540 nm (nanometers); and FIG. 3 is a diagram illustrating the geometry of the optical system layout, plane I indicating the location of the MOD lens and plane II is the focal plane, of the MOD lens.

Referring to FIG. 1, the blaze profile is on one side of a substrate of optically transmissive material. The lens is operative in transmission, although with the surface of the profile coated with a reflective material, it may be operative in reflection. The number of waves for each zone boundary is indicated as p and the phase jump of phases at each zone boundary, which are at radii r1, r2, r3 and r4 is constant. The center of the lens is along the optical axis and is perpendicular to the plane of the planar substrate on which the profile is formed. The profile of the lens may also be a phase reversal (or Wood) profile, or a multi-level approximation to the blaze profile. Such other profiles provide a multiple of $2\lambda$ phase jumps, i.e., $2\pi p$, where p is an integer equal or greater than two. Such other profiles, but which are the standard one wave phase jump, are known in the art and are discussed in an article by D. Faklis, and G. M. Morris, the inventors hereof, which appeared in the 1993 Photonics Design and Application Handbook.

The profile may be defined between substrates, rather than on a planar surface of a substrate, as shown, where the substrates on opposite sides of the profile have different indicies of refraction. The profile may be defined on a curved substrate.

The zone spacing or width of the zones between the zone boundaries $r_1-r_2$, $r_2-r_3$, $r_3-r_4$ are full period Fresnel zones. These zones are defined such that the optical path difference across the jth zone is equal to "$P\lambda_0$" where $\lambda_0$ is the design wavelength, $F_0$ is the focal length, when the illumination wavelength $\lambda=\lambda_0$, and p is an integer that represents the maximum phase modulation as a multiple of $2\pi$. In the paraxial region, the locations of the zones in the plane of the lens are given by $$r_j^2 2jp\lambda_0 F_0 \qquad (1)$$

The optical phase introduced by the diffractive element is given by $$\phi(r) = 2\pi\alpha p \left[ j - \frac{r^2}{2p\lambda_0 F_0} \right], r_j \leq r < r_{j+1}, \qquad (2)$$

where $\alpha$ is defined as the fraction of $2\pi$ phase delay that is introduced for illumination wavelengths other than the design wavelength and is given by $$\alpha = \frac{\lambda_0}{\lambda} \left[ \frac{n(\lambda) - 1}{n(\lambda_0) - 1} \right] \qquad (3)$$

where n is the index of refraction of the material in the grating region. The maximum height of the surface relief is given by $$h_{max}(r) = \frac{p\lambda_0}{n(\lambda_0) - 1} \qquad (4)$$

The amplitude transmission function of the diffractive lens can be expanded as a Fourier series to give $$t(r) = \sum_{m=-\infty}^{\infty} e^{-i\pi(\alpha p - m)} \text{sinc}(\alpha p - m) e^{-\frac{i\pi r^2 m}{p\lambda_0 F_0}}, \qquad (5)$$

where $\text{sinc}(x)=\sin(\pi x)/(\pi x)$ and m denotes the m-th diffraction order. The transmission function in Eq. (5) represents a diffractive lens within the paraxial approximation.

$$F(\lambda) = \frac{p\lambda_0 F_0}{m\lambda} \qquad (6)$$

The focal length in Eq. (6) is proportional to p and inversely proportional to the illumination wavelength and the diffraction order, m. When the quantity in Eq. (6), $p\lambda_0/m\lambda$, is set equal to unity, several wavelengths can come to a common focus. p is a construction parameter and is usually constant across the lens radius and the wavelengths that are focused to a common point are chosen from a set of diffraction orders (i.e. multi-order diffractive lenses). While a diffractive lens with a maximum phase modulation of $2\pi$ can allow a mutual focus for simple harmonics of the design wavelength, the parameter p offers a mechanism to control specific wavelengths in a given band or bands that will come to a fixed focus. This property allows the design of achromats and apochromats using a single diffractive surface.

The scalar diffraction efficiency, $\eta_m$, of the m-th diffracted order is given by the squared modulus of its Fourier coefficient in Eq. (5), i.e.

$$\eta_m = \text{sinc}^2(\alpha p - m) \tag{7}$$

The diffraction efficiency given by Eq. (7) is unity when the argument of the sinc function is equal to zero. Notice that this condition can allow for high diffraction efficiency for several wavelengths. For example, consider the case of a multi-order diffractive lens operating in the visible region with p=10. FIG. 2 illustrates the wavelength dependence of the diffraction efficiency for a range of diffracted orders neglecting material dispersion. The peaks in diffraction efficiency occur at precisely those wavelengths that come to a common focus (see Eq. (6)), i.e., $$\lambda_i = \frac{p\lambda_0}{m} \tag{8}$$

The wavelength bandwidth of the diffraction efficiency around a given diffracted order narrows with increasing values of p (see Eq. (7) and FIG. 2).

Using Eq. (8), it is possible to choose the parameters p and m to design a diffractive singlet that has high diffraction efficiency for specific bands in a given spectrum. The center wavelength of each of these bands comes to a focus a distance $F_0$ behind the lens.

A MOD lens operating with multiple spectral bands may be particularly useful for color display applications. For example, if one chooses p=6 and $\lambda_0 = \lambda_g = 550$ nm (green light), then based on Eq. (8), the following wavelengths in the visible spectrum are brought to a common focal point with high efficiency: $\lambda_r = 660$ nm (red), using the 5th order for green; $\lambda_g = 550$ nm (green); and $\lambda_b = 471$ nm (blue), using the 7th order for blue.

If one chooses p=7 and $\lambda_0 = \lambda_g 550$ nm (green light), then again based on Eq. (8), the wavelengths in the visible spectrum that would be brought to a common focal point with high efficiency are: $\lambda_r = 642$ nm (red), $\lambda_g = 550$ nm (green), and $\lambda_b = 481$ nm (blue).

As another example, if one chooses p=10 and $\lambda_0 = \lambda_g = 540$ nm (green light), the following wavelengths in the visible spectrum would be brought to a common focal point with high efficiency: $\lambda_r = 600$ nm (red), $\lambda_g = 540$ nm (green), and $\lambda_b = 450$ nm (blue); these wavelengths are very close to the spectral peaks of tristimulus filters designed to match a CIE 1931 standard observer which serves as a standard in many color-display applications. See, spectral response curves showing the degree to which a photocell combined with tristimulus filters may at best duplicate the color matching function of the CIE 1931 standard colorimetric observer in D. B. Judd and G. Wyszecki, Color in Business, Science & Industry, (Wiley, New York, 1975).

Another important application of MOD lenses with illumination containing multiple spectral bands is as an alignment system for optical systems that operate using wavelengths outside of the visible spectral band. Such systems are typically difficult to align. However, by using a MOD lens, one can achieve identical imaging properties at two or more wavelengths, i.e., one at the operating wavelength (outside of the visible spectrum) and one at a wavelength that lies within the visible wavelength band; thereby greatly facilitating the alignment of the optical system. For example, by using a MOD lens with the specified value for p and diffraction order m (see Eq. (9)), the following pairs of wavelengths will exhibit the same imaging properties:

| Parameters p, m | Operating Wavelength, $\lambda_0$ | Visible Wavelength | Application Area |
|---|---|---|---|
| 9,5 | 351 nm Argon laser line | 632 nm He—Ne laser | Photolithography |
| 3,2 | 325 nm He—Cd laser | 488 nm Argon laser | Photolithography |
| 5,9 | 1.06 μm Nd:YAG laser | 589 nm Sodium D-line | Optical communications; Laser scalpels |

The laser scalpel application identified in the table is a particularly important application. With current instrumentation, it is difficult to know precisely where the laser scalpel will actually cut, because the laser radiation (for example, light from a Nd:YAG laser) is not in the visible part of the spectrum. However, by using a MOD lens in accordance with the present invention, sodium D light, produced by a simple incandescent light bulb, could easily be introduced into the optical system and it would come to focus with high efficiency at precisely the same focal position as the laser light used for cutting; hence, the present invention would enable a surgeon to see precisely where the laser scalpel will be (is) focusing (or cutting).

It has been shown above that a multi-order diffractive (MOD) lens offers the potential for several wavelength components of the incident spectrum to come to a common focus. As a result, the polychromatic performance of the MOD singlet will differ substantially from the typical diffractive lens operating in a single diffraction order. Using the diffractive lens transmission function given in Eq. (5), the optical transfer function (OTF) for the paraxial diffractive singlet as a function of wavelength may be calculated. Only the effects of the wavelength-dependent defocus and not any higher-order aberrations need to be included, since these aberrations can be accounted for by including appropriate phase terms in the diffraction integrals.

FIG. 3 illustrates the geometry to compute the field distribution in the rear focal plane, which is given by $$U_{II}(u,v;\lambda) = \tag{9}$$

$$\frac{-i}{\lambda F_0} \int \int_{-\infty}^{\infty} U_I(x,y;\lambda) P(x,y;\lambda) e^{\frac{i\pi}{\lambda F_0}[(u-x)^2+(v-y)^2]} dxdy,$$

where (u,v) represent the coordinates in plane II located a distance $F_0$ away and $P(x,y)$ is the complex pupil function. Substituting Eq. (5) into Eq. (9) and assuming a unit-amplitude plane wave as the input gives $$U_{II}(u,v;\lambda) = \frac{-i e^{\frac{i\pi}{\lambda F_0}(u^2+v^2)}}{\lambda F_0} \sum_{m=-\infty}^{\infty} e^{-i\pi(\alpha p-m)} \text{sinc}(\alpha p - m) \cdot \tag{10}$$

$$\int \int_{-\infty}^{\infty} P(x,y;\lambda) e^{\frac{-i\pi}{\lambda} \epsilon(x^2+y^2)} e^{\frac{-i2\pi}{\lambda F_0}(ux+vy)} dxdy$$

where $$\epsilon = \frac{1}{F_0} \left[ \frac{m\lambda}{p\lambda_0} - 1 \right] \tag{11}$$

From Eq. (10), it can be seen that the magnitude of the quantity e, is related directly to the amount of defocus in plane II. If other aberrations were present, one could construct a generalized pupil function in Eq. (10) that includes the phase errors introduced by the aberrations. The OTF is given by the autocorrelation of the generalized pupil function, suitably normalized, $$OTF(f_x, f_y) = \tag{12}$$

$$\frac{\int\int_{-\infty}^{\infty} H\left(\xi + \frac{f_x}{2}, \eta + \frac{f_y}{2}\right) H^*\left(\xi - \frac{f_x}{2}, \eta - \frac{f_y}{2}\right) d\xi d\eta}{\int\int_{-\infty}^{\infty} |H(\xi,\eta)|^2 d\xi d\eta}$$

where H represents the coherent transfer function of the system. Assuming a rectangular pupil for simplicity, and using Eq. (10), the OTF as a function of the spectral frequencies $f_x$, $f_y$, is given by $$OTF(f_x, f_y) = \Lambda\left(\frac{f_x}{2f_0}\right) \Lambda\left(\frac{f_y}{2f_0}\right) \sum_{m=-\infty}^{\infty} \text{sinc}^2(\alpha p - m) \cdot \tag{13}$$

$$\text{sinc}\left[\frac{\epsilon l^2}{\lambda}\left(\frac{f_x}{2f_0}\right)\left(1 - \frac{|f_x|}{2f_0}\right)\right] \text{sinc}\left[\frac{\epsilon l^2}{\lambda}\left(\frac{f_y}{2f_0}\right)\left(1 - \frac{|f_y|}{2f_0}\right)\right],$$

where l is the diameter of the pupil aperture and $$f_0 = \frac{l}{2\lambda F_0}, \tag{14}$$

represents the cutoff frequency. In the derivation of Eq. (13) using Eq. (12), the cross terms in the double summation vanish due to an orthogonality condition for the diffracted orders. With reference to Eq. (13), note that for the cases when p=m=α=1 and when p=m and α=1, the OTF reduces to $$OTF(f_x, f_y) = \Lambda\left(\frac{f_x}{2f_0}\right) \Lambda\left(\frac{f_y}{2f_0}\right) \tag{15}$$

which represents the diffraction-limited OTF associated with a rectangular aperture.

Equation (13) illustrates the imaging characteristics of the MOD lens. It contains three main terms: a) triangle functions that represent the diffraction-limited portion of the OTF; b) the sinc² function, which is the diffraction efficiency in a given order, acts as a weighting function; and c) the sinc terms that represent the degradation in the OTF due to defocus. It is important to note that the weighting function peaks to a value of unity whenever the argument is equal to zero. For the case of p=1, the typical diffractive lens in the visible wavelength range, $\lambda_0/\lambda=m$; only the design wavelength will have high diffraction efficiency. Furthermore, the sinc terms in the OTF illustrate that only the design wavelength will come to a sharp focus in the image plane (i.e. $\epsilon$ is zero) and all other wavelength components in the band will be severely defocused (i.e. $\epsilon$ is non-zero). For the case when p>2, the MOD lens can allow several wavelengths to have high diffraction efficiency (i.e. $\lambda_0/\lambda=m$) and a common focus (i.e. $\epsilon$ can be zero for several discrete wavelengths). Equation (13) describes how a MOD lens can provide superior performance in broadband or multi-spectral illumination.

The previous imaging examples describe the effects of a wavelength-dependent defocus, but do not describe the effects of off-axis aberrations. In general, the MOD lens will have different wavelength-dependent aberration properties than the conventional diffractive singlet (i.e. p=1). However, for the important case of wide-field diffractive lenses, one finds that the third-order aberration properties of the MOD lens are identical to those found for the conventional wide-field diffractive singlet. For example, a MOD landscape lens (infinite-conjugate imaging) will have no coma, astigmatism, and Petzval curvature for each wavelength that satisfies the equation $\lambda_0 p/\lambda = m$; hence, a MOD lens is able to provide high quality imaging in broadband or multi-spectral illumination over wide fields of view.

From the foregoing description it will apparent that there has been provided an improved diffractive element and particularly a element which functions as an MOD lens, variations and modifications in the herein described optical elements and lenses, within the scope of the invention, will undoubtedly suggest themselves to those skilled in the art. Accordingly, the foregoing description should be taken as illustrative and not in a limiting sense.

What is claimed is:

1. A diffractive lens for directing a plurality of different wavelengths of radiation to a single focus which comprises a diffractive structure having a plurality of zones which define zone boundaries at which light incident on the structure experiences an optical phase shift, and which diffract light of each of said wavelengths in a different diffractive order, m, such that m≧1, to said focus, thereby providing a plural order diffractive singlet.

2. The lens according to claim 1 wherein said zone boundaries present the same optical phase shift to light of one of said plurality of wavelengths, which phase shift is greater than one wave.

3. The lens according to claim 2, wherein said zones are radially spaced at radii, $r_j$ and said radii are obtained by solving the equation $\phi(r_j)=2\pi p_j$ where $\phi(r)$ represents the phase function for the wavefront emerging from the diffractive lens, and p represents the number of $2\pi$ phase jumps at the zone boundaries for one of the plurality of wavelengths where p is an integer >1.

4. The lens according to claim 2 wherein said element defines a lens having a focal length and the zone boundaries are numbered in order of their radial distance from center of the lens, said zones defining different optical path lengths to the focus which are equal to the sum of the focal length of the lens and the product of the number of the zone boundary, the phase shift presented by the boundary in waves and the wavelength of said one of said plurality of wavelengths.

5. The lens according to claim 4 which defines an optical axis along the center of the lens, and the focal length is along said optical axis.

6. The lens according to claim 4 wherein said annular zones are circular and centered about said optical axis.

7. The lens according to claim 1 wherein said structure has a surface relief profile.

8. The lens according to claim 7 wherein said surface relief profile is a blaze profile.

9. The lens according to claim 1 wherein said lens has optical power.

10. The lens according to claim 7 wherein said surface relief profile is on an optically transmissive substrate.

11. The lens according to claim 10 wherein said substrate has opposite surfaces on one of which said profile is disposed and the other is planar.

12. The lens according to claim 1 wherein the phase shift at the boundaries is a phase jump $\phi(r_j)=2\pi p$ where j is the an integer indexing to border of the boundaries, $r_j$ is the locations of the boundaries in number order, j=1 being the zone boundary location closest to the center of the zones, and p is an integer, equal or greater than two, and $\lambda_0$ is one of said plurality of wavelengths and $\lambda_i$ are others of said plurality of wavelengths where $$\lambda_i = \frac{p\lambda_0}{m},$$

where m is the order of diffraction of each of said others of said plurality of wavelengths to said focus.

13. The lens according to claim 12 wherein said lens has a focal length $F_0$ to said focus and said zone boundaries locations $r_j$ are determined by the following equation $$r_j^2 = 2jp\lambda_0 F_0$$

14. The lens according to claim 13 wherein said plurality of wavelengths is two and said element is an achromat singlet.

15. The lens according to claim 13 wherein said plurality of wavelengths are three and said lens is an apochromat singlet.

16. The lens according to claim 15 wherein said wavelengths are wavelengths which appear as red, blue and green colors to the human eye, respectively.

17. The lens according to claim 1 wherein said lens focuses a multiplicity of wavelengths which constitute said plurality at said single focus, each with a different diffractive order and said lens is a multi-order diffractive (MOD) lens.

18. The lens according to claim 17 wherein one of said multiplicity of wavelengths is a wavelength of about the middle of a band including said multiplicity of wavelengths.

19. The lens according to claim 1 wherein said plurality of wavelengths are within broadband or multi-spectral illumination.

20. The lens according to claim 7 wherein said surface relief profile defines a reflective surface.

21. The lens according to claim 4 wherein said zones are elliptical and centered about said optical axis.

* * * * *

UNITED STATES PATENT AND TRADEMARK OFFICE
CERTIFICATE OF CORRECTION

PATENT NO.    : 5,589,982
DATED         : December 31, 1996
INVENTOR(S)   : Dean Faklis and G. Michael Morris It is certified that error appears in the above-identified patent and that said Letters Patent is hereby corrected as shown below:

Title page,
Item [56], References Cited, U.S. PATENT DOCUMENTS, replace "Burall et al." with -- Buralli et al. --; after "Ceglio" (two occurrences) insert -- et al. --; replace "Saye" with -- Sax --; and replace "5,299,797 4/1994 Futhey" with -- 5,229,797 7/1994 Futhey et al. --.

Column 1,
Line 32, delete "$s_2r_j^2+$"

Column 4,
Line 34, after "$r_j^2$" insert -- = --.

Signed and Sealed this

Eleventh Day of May, 2004

JON W. DUDAS
*Acting Director of the United States Patent and Trademark Office*